Nov. 20, 1934.  L. T. MURPHY  1,981,321
LAMINATED BOARD MAKING MACHINE
Filed July 22, 1930  2 Sheets-Sheet 1
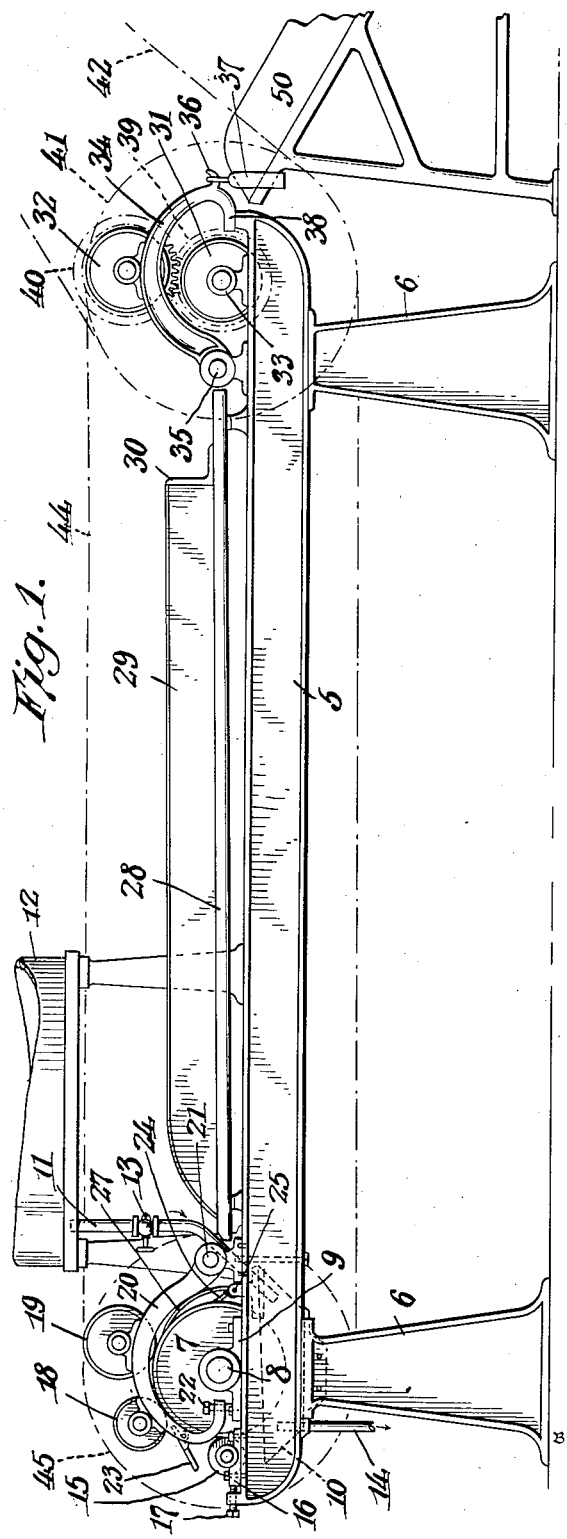
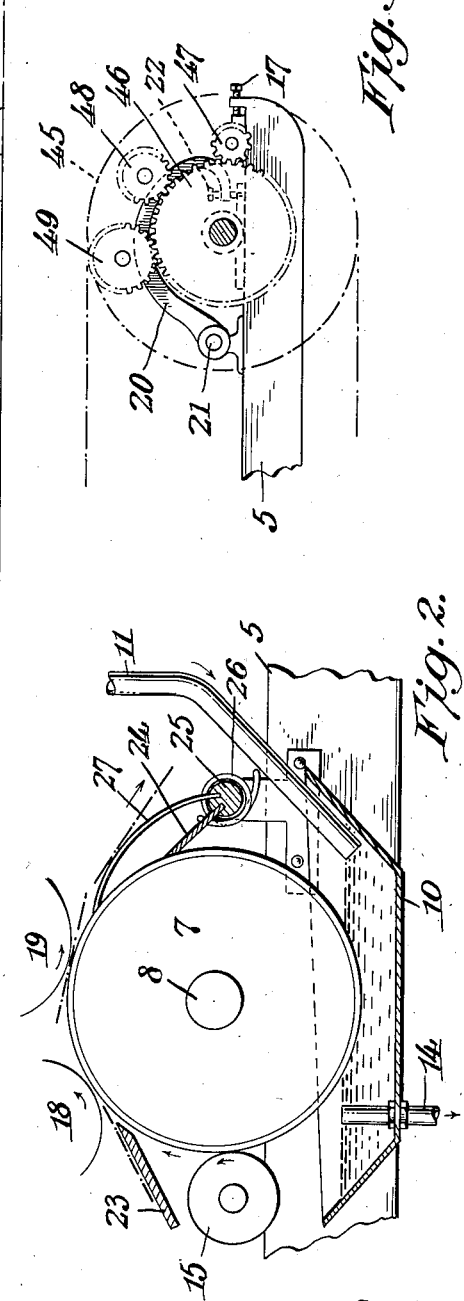
Inventor
L. T. Murphy
Attorney Nov. 20, 1934.  L. T. MURPHY  1,981,321
LAMINATED BOARD MAKING MACHINE
Filed July 22, 1930    2 Sheets-Sheet 2
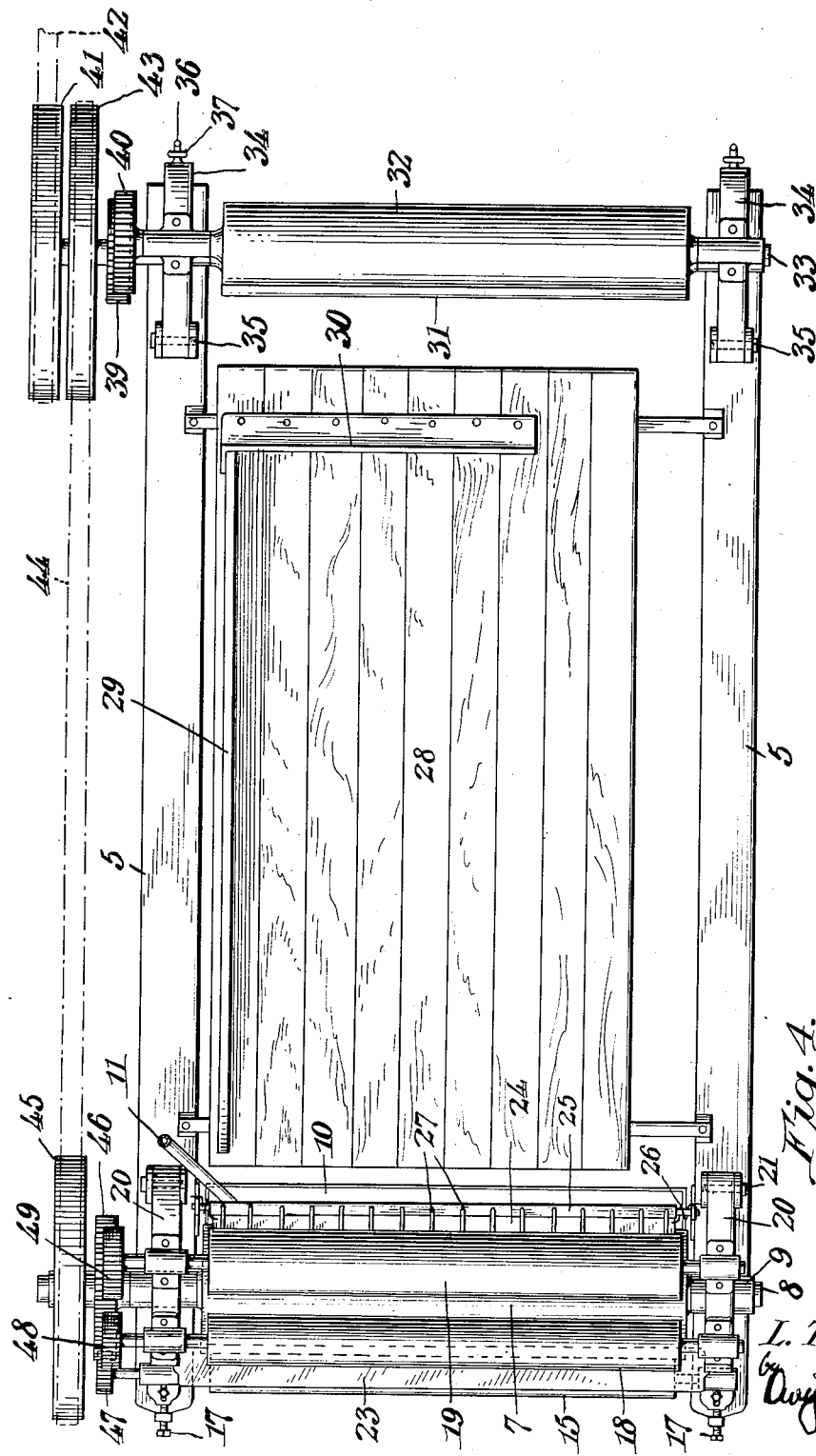

Patented Nov. 20, 1934

1,981,321

UNITED STATES PATENT OFFICE 1,981,321

LAMINATED BOARD MAKING MACHINE

Lloyd Thurman Murphy, Chattanooga, Tenn.

Application July 22, 1930, Serial No. 469,762

3 Claims. (Cl. 91—51)

This invention relates to machines for making laminated sheets or boards, such, for instance, as may be made of paper, fiber, or card board or wood veneer, etc., the invention being designed particularly to facilitate the paste applying, stacking and pressing operations necessary in the production of laminated sheets of the character generally stated.

The primary object of the invention is to provide a machine which operates in such manner as to enable the several sheets of the laminated board to be properly pasted together and compressed in such manner as to greatly economize time and materials as well as to generally improve the finished article.

A further object of the invention is to provide a machine of the character thus generally stated wherein the paste applying and pressing mechanism are both embodied in one machine.

A further object is to provide improved means in the application of paste to the individual sheets, whereby an amount of paste only is applied to each sheet sufficient to insure proper and thorough adhesion to its cooperating sheet, and whereby the paste is applied in such manner and through such instrumentalities as will prevent paste becoming engaged with the edges of a sheet or upon an exposed surface of the finished laminated board. A further object is to provide means in both the paste applying and compressing portions of the machine to permit of boards or layers of various thicknesses being properly treated.

With these objects in view, together with others which will appear as the description proceeds, the invention consists in the novel construction, combination, and arrangement of parts, all as will be more particularly described hereinafter, illustrated in the drawings, and particularly pointed out in the claims.

In the drawings:

Fig. 1 is a side elevation of a machine disclosing the invention in its preferred embodiment, Fig. 2 is an enlarged fragmentary side elevation illustrating the paste applying portion of the machine, Fig. 3 is a detailed view showing the manner in which the paste and feeder rolls are operated, and Fig. 4 is a top plan view of the improved machine.

In this preferred embodiment of the invention, the mechanism for carrying out the several functions is mounted or carried upon a base or supporting frame 5 mounted at a proper height upon legs or pedestals 6. This base carries a paste applying mechanism at one end, a receiving table or support at the middle part thereof, while compressing mechanism is mounted at the opposite end of the support.

The paste applying mechanism includes a roll or cylinder 7 disposed transversely at the feed end of the support 5 and is carried upon a suitable shaft 8 mounted in bearings 9 at the sides of the supporting frame. Arranged beneath the roll or cylinder 7 is a paste trough or pan 10 within which the lower portion of the cylinder engages, the level of the paste within the pan being such that the lower portion of the said cylinder is at all times submerged. Liquid paste may be fed or delivered to the trough or pan 10 through a duct 11 leading from any suitable source of supply, such for instance as a tank represented at 12. It will be understood, however, that paste may be pumped through duct 11 if desired and a valve 13 may be applied to the duct to govern the flow of paste to the trough. The level of the paste within the pan or trough 10 may be governed by the overflow or lead-off 14.

Arranged transversely upon the supporting frame 5 and in advance of the paste roll 7 is a clearing roll 15 which normally contacts the paste roll throughout its entire length in order to prevent an excessive quantity of paste being carried upon the roll 7. This clearing roll has its journals mounted in adjustable bearings 16 which may be moved toward or away from the periphery of paste roll 7 by operation of the adjusting screws 17. It will be understood that adjustments of the clearing roll may thus be made in order to accurately govern the thickness of the paste film carried by the roll 7.

The paste roll 7 has cooperating therewith one or more feeder rolls to insure intimate contact between the stock and the paste roll in the paste applying operation. In the present or preferred form of the invention there are two of these rolls employed and are indicated as first and second feed rolls 18 and 19. These rolls are capable preferably of adjustment toward or away from the paste roll for purposes which will more fully hereinafter appear. In the preferred construction, these feeder rolls are mounted in spaced parallel relation upon a frame capable of moving toward or away from the paste roll 7. This frame includes a pair of arms 20 arranged one at each side of the main supporting frame 5 and pivotally connected thereto as at 21. The free or forward ends of arms 20 are slotted or recessed to receive adjusting screws 22 which cooperate with the main frame of the machine in adjusting the feeder roll frame. It will be understood that with this construction the feeder rolls 18—19 may be accurately adjusted toward or away from the paste roll to accommodate various thicknesses of stock fed to the machine. The feeder roll frame also carries a guide 23 disposed in advance of the foremost feeder roll, to facilitate proper guiding of the sheets of stock to the pasting apparatus.

It is preferred that the feeder rolls 18—19 be arranged in such manner as to cause the stock fed to the machine to be brought into intimate contact with the paste throughout a substantial portion of the paste roll area. To this end, these feeder rolls are spaced apart a substantial distance and have their axes disposed one upon each side of a vertical radius of the paste cylinder. It will be noted that stock fed between the smaller first feed roll 18 and the paste roll 7 will be caused to move into engagement with the larger second feed roll 19 below the horizontal axis of the latter, whereby the forward edge of the stock will be moved downwardly into contact with the paste roll and between said paste roll and said feed roll 19.

Arranged upon that side of the paste roll opposite to the clearing roll 15 is a doctor or scraper 24 extending the full length of the paste roll and having its scraping edge at all times at contact therewith. This scraper is mounted upon a shaft 25 disposed transversely of the support 5 and mounted in suitable bearings thereon; the said shaft being held in position with the scraper 24 yieldingly engaged with the paste roll 7 by means of one or more springs 26. The shaft 25 also carries guide fingers 27 which have their free ends resting upon the surface of the paste roll 7 immediately adjacent to the delivery side of the feeder roll 19. These fingers are so arranged as to be engaged by the stock as it emerges from the pasting mechanism and causes the same to be directed properly upon the table or receiver 28, and obviates the possibility of the stock, however thin, following around the paste roll. The scraper or doctor 24 cleans or scrapes the surface of the paste cylinder 7 immediately subsequent to all paste applying operations and prior to the entry of the cylinder surface to the paste tray.

The table 28 is arranged upon the base or support 5 in a position to receive stock delivered from the paste apparatus. This table will be of such breadth as to accommodate sheets delivered thereto, and its length will be equal to or greater than the largest length of stock which it is proposed to use in the machine. The table may be provided with upstanding side and end members 29 and 30 to properly adjust the pasted sheets upon the table.

The stock compressing mechanism is arranged upon the supporting frame adjacent to the delivery end of table 28 and includes a pair of spaced compressing rolls 31 and 32. These rolls are disposed transversely of the supporting frame or base 5 and are substantially the same length as the pasting rolls. The roll 31 is journaled in suitable bearings 33 affixed to the frame 5, while roll 32 is journaled in bearings carried by arms 34 pivoted as at 35 to the base 5. The free ends of these arms may be equipped with hook members 36 upon which suitable weights 37 may be supported. It is preferred that the free ends of arms 34 be turned in as at 38 to provide stops to engage the frame 5 to limit the movement of the upper compression roll toward the fixed roll.

The shafts supporting rolls 31—32 are provided with intermeshing gears 39—40, while the shaft of fixed roll 31 is provided with a pulley 41 over which a power belt 42 passes. With this construction it is apparent that upon an application of power to the pulley 41, the compressing rolls 31—32 will rotate simultaneously.

The shaft of compression roll 31 is also equipped with a pulley 43, over which passes a belt represented generally at 44 passing over a pulley 45 carried by shaft 8 of the paste cylinder. The shaft 8 is also provided with a gear 46 which is enmeshed with gears 47, 48 and 49 on the shafts or rolls 15, 18 and 19. It is apparent, therefore, that upon the application of power to the pulley 41, not only will the compressing rolls 31—32 be caused to operate, but also the paste roll as well as the clearing roll and feeder rolls.

In the operation of the machine, when it is desired to paste together a pair of sheets, one of such sheets is placed properly upon the table 28, while the other sheet is fed into the pasting mechanism by having its forward edge engaged upon the guide 23. The paste roll as well as the feeder rolls 18—19 are rotated in such direction as will cause the sheet to be drawn in between such rolls, and the feeder rolls will firmly press such sheet down upon the moistened surface of the paste roll 7. By reason of the particular spacing of the feeder rolls, a substantial area of the sheet is forced into intimate contact with cylinder 7 and maintained so for such a period as will cause the under surface of the sheet to become sufficiently coated with a film of paste. The thickness of this film will be governed by the clearing roll 15 as has been before described. It will be observed that the feeder rolls are at all times out of contact with the paste roll 7 so that when the pasting mechanism is idling no paste can collect upon the feeder rolls. The upper surface of the stock, as well as the edges thereof are thus assured of always being free or clear of paste.

As the stock passes between the paste and feeder rolls it is guided properly upon the sheet resting upon table 28 by means of guide fingers 27. When the sheet thus coated upon its under surface is properly positioned upon the uncoated sheet upon the table, the two ply thickness thus formed is ready to be passed through the compressing mechanism. Should it be desired to make the finished product of more than two thicknesses of stock it will be understood that additional sheets may be fed through the pasting mechanism until the requisite laminæ has been reached. The composite board thus formed is lifted from the table and is fed between the compression rolls 31—32, whereupon all air pockets between the several sheets are smoothed out, as well as wrinkles or other undulations. When the composite board passes from the compression mechanism it drops into a receptacle 50, from whence it may be removed and stacked.

By means of the machine thus described it is possible to form laminated boards with greater facility, with a minimum of operation, at a great saving of materials as well as time and the product is a composite board of the required laminæ free of air pockets, tightly compressed and having its exposed surfaces and edges entirely free of paste.

It will be understood that the gears associated with the paste applying and compression rolls will be such as to permit of relative adjustment or movement of the several rolls without disengagement of the teeth. The foregoing is a description of the invention in its preferred embodiment, however, it will be understood that variations may be made in the details of construction and the general arrangement of the several parts without departing from the spirit of the invention as defined by the claims.

Having thus described my invention, I claim:

1. In a machine of the class described, a paste roll, a frame movable toward or away from said paste roll, a pair of positively driven feed rolls carried by said frame and spaced concentrically with said paste roll, the first of said feed rolls being of a diameter smaller than the second feed roll, the axes of said feed rolls at all times parallel to the axis of said paste roll, and means limiting the movement of said frame in the direction of said paste roll.

2. In a machine of the class described, a paste roll, a frame movable toward or away from said paste roll, said rolls rotatably carried by said frame in spaced relation to each other and concentrically with said paste roll, the first of said feed rolls being of a diameter smaller than the second feed roll, the axes of said paste and feed rolls at all times parallel, a gear carried by said paste roll, and gears on said feed rolls for intermeshing engagement with said paste roll gear.

3. In a machine of the class described, a paste roll, a frame pivoted adjacent said roll and having its free end movable toward and away from said roll, feed rolls rotatably carried by said frame in spaced relation to each other and concentric with said paste roll, the first of said feed rolls being of a diameter smaller than the second feed roll, the axes of said paste and feed rolls at all times parallel, a gear carried by said paste roll and gears on said feed rolls for intermeshing engagement with said paste roll whereby upon swinging of the frame away from the paste roll the said gears will become disengaged.

LLOYD THURMAN MURPHY.